(12) United States Patent  
Dalmazzone et al.

(10) Patent No.: US 9,267,648 B2  
(45) Date of Patent: Feb. 23, 2016

(54) SYSTEM AND METHOD FOR THE CONTINUOUS DETECTION OF IMPACTS ON PIPELINES FOR THE TRANSPORTATION OF FLUIDS, PARTICULARLY SUITABLE FOR UNDERWATER PIPELINES

(75) Inventors: Mauro Gianni Dalmazzone, Cologno Monzese (IT); Gianpietro De Lorenzo, Segrate (IT); Giuseppe Giunta, San Donato Milanese (IT)

(73) Assignee: ENI S.p.A., Rome (IT)

( * ) Notice: Subject to any disclaimer, the term of this patent is extended or adjusted under 35 U.S.C. 154(b) by 729 days.

(21) Appl. No.: 13/499,041

(22) PCT Filed: Sep. 15, 2010

(86) PCT No.: PCT/IB2010/002330  
§ 371 (c)(1),  
(2), (4) Date: Jun. 6, 2012

(87) PCT Pub. No.: WO2011/039589  
PCT Pub. Date: Apr. 7, 2011

(65) Prior Publication Data  
US 2012/0243376 A1 Sep. 27, 2012

(30) Foreign Application Priority Data  
Sep. 29, 2009 (IT) .............................. MI2009A1667

(51) Int. Cl.  
*G01S 11/00* (2006.01)  
*F17D 5/06* (2006.01)  
*G01S 11/14* (2006.01)

(52) U.S. Cl.  
CPC .. *F17D 5/06* (2013.01); *G01S 11/14* (2013.01)

(58) Field of Classification Search  
USPC ....................................................... 367/127  
See application file for complete search history.

(56) References Cited

U.S. PATENT DOCUMENTS

| | | | | |
|---|---|---|---|---|
| 3,838,593 | A * | 10/1974 | Thompson ................. | 73/40.5 A |
| 4,543,817 | A | 10/1985 | Sugiyama | |
| 5,038,614 | A | 8/1991 | Bseisu et al. | |
| 5,151,882 | A * | 9/1992 | Kingman ......................... | 367/82 |
| 5,974,862 | A * | 11/1999 | Lander et al. ............... | 73/40.5 A |
| 6,453,247 | B1 * | 9/2002 | Hunaidi ........................... | 702/51 |
| 6,567,006 | B1 * | 5/2003 | Lander et al. ................. | 340/605 |
| 6,725,705 | B1 * | 4/2004 | Huebler et al. ............ | 73/40.5 A |
| 6,912,472 | B2 * | 6/2005 | Mizushina et al. ............. | 702/51 |
| 6,957,157 | B2 * | 10/2005 | Lander ............................ | 702/56 |
| 7,596,458 | B2 * | 9/2009 | Lander ............................ | 702/56 |

(Continued)

OTHER PUBLICATIONS

International Search Report Issued Feb. 11, 2011 in PCT/IB10/02330 Filed Sep. 15, 2010.

*Primary Examiner* — James Hulka  
(74) *Attorney, Agent, or Firm* — Oblon, McClelland, Maier & Neustadt, L.L.P.

(57) ABSTRACT

A system and method for continuous detection of impacts on pipelines for fluid transportation, particularly on pipelines placed on the seabed. The system includes at least two sensors each installed in correspondence with an end of a section subject to detection of a pipeline. A first sensor of the at least two sensors is configured to detect first acoustic waves, which propagate along a first transmission phase associated with the pipeline, and a second sensor of the at least two sensors is configured to detect second acoustic waves which propagate along a second transmission phase associated with the pipeline. The second acoustic waves have different elastic features with respect to the first acoustic waves.

4 Claims, 3 Drawing Sheets

(56) References Cited

U.S. PATENT DOCUMENTS

| | | |
|---|---|---|
| 2002/0149487 A1 | 10/2002 | Haines et al. |
| 2006/0225507 A1 | 10/2006 | Paulson |
| 2007/0130317 A1* | 6/2007 | Lander ......................... 709/224 |
| 2008/0033656 A1* | 2/2008 | Herwanger ..................... 702/18 |
| 2008/0165617 A1* | 7/2008 | Abbot et al. ..................... 367/3 |
| 2008/0316859 A1* | 12/2008 | Welker et al. .................. 367/17 |
| 2009/0000381 A1 | 1/2009 | Allison et al. |

\* cited by examiner

SYSTEM AND METHOD FOR THE CONTINUOUS DETECTION OF IMPACTS ON PIPELINES FOR THE TRANSPORTATION OF FLUIDS, PARTICULARLY SUITABLE FOR UNDERWATER PIPELINES

The present invention relates to a system and method for the continuous detection of impacts on pipelines used for the fluids transportation, particularly on pipelines positioned on the seabed.

For detecting impacts on pipelines used for the fluids transportation, the use is currently known, a plurality of acoustic sensors distributed along the length of the pipeline, suitable for detecting the presence of waves generated by an impact in the fluid inside the pipeline.

The use of sensors such as hydrophones or alternatively accelerometers, for example, is known.

As schematically illustrated in FIGS. 1a and 1b, the position and instant of the impact 101 are determined on the basis of surveys effected by two hydrophones 102 or two accelerometers 102' situated at the two ends of a section subject to the length x of a pipeline 103 in, which the impact 101 takes place. The wavefronts 104,104' generated by the impact 101, propagating homodirectionally in the fluid away from the generation point, move, in fact, in both directions along the development of the pipeline 103, reaching the two sensors 102, 102' in times depending on the relative distance between the same and the impact point.

On the basis of the time difference between the surveys of the arrivals of the two wavefronts 104, it is possible to determine the relative distance between the impact point 101 and the two sensors 102,102', the intensity of the impact and also the generation instant of the wavefronts.

This detection system and method are particularly suitable for easily accessible pipelines. In the case of hydrophone systems, for example, the sensors must be installed along the whole development of the pipeline so as to be in contact with the fluid inside the same. Also in the case of accelerometer systems, the sensors must be installed along the whole development of the pipeline and in particular, so as to be in direct contact with the outer surface of the same.

For the detection, the pipeline is divided into a plurality of sections subject to detection x having a length corresponding to the detection range of the particular sensor used, which in the case of hydrophones and accelerometers corresponds to about 20-50 km, and the sensors are installed at the ends of the sections subject to detection defined.

Although this system provides good detection results in terms of precision and survey delays, it cannot be used in the case of installations which are not easily reached.

In the case of underwater pipelines, for example, the installation of hydrophones or accelerometers along the section of pipelines positioned and possibly laid on the sea bottom would lead to an alteration in the structure or coating of the pipelines, thus weakening the whole transportation system which would no longer be integral.

Furthermore, sensors installed on the seabed would create either problems relating to the feeding or also considerable maintenance problems, considering the difficult accessibility to these.

These systems, moreover, cannot be applied to underwater pipelines already launched, as the positioning of the sensors along the section of pipeline positioned on the sea bottom is extremely difficult.

The installation of hydrophones for detecting impacts on underwater pipelines could be effected in correspondence with the two starting and arrival shores, the distance between the shores however is generally such as to define a detection section having a much greater length than the capacity of the sensors. It would therefore not be possible to detect signals useful for determining the position, intensity and impact instant at the two ends of such a detection section.

The systems currently known cannot therefore be used for detecting impacts on underwater pipelines.

There is however a great necessity for monitoring impacts along the sections of pipelines installed at the sea bottom, and in particular in the section close to the shore.

In underwater pipelines, it is currently possible to only detect the presence of an impact which causes damage to the pipe by determining the leakage of fluid being transported, corresponding to a lack of or decrease in the pressure of the same at the receiving end, or by the sighting of leakages emerging on the surface.

The known systems for detecting impacts on pipelines for the fluids transportation, moreover, cannot be applied to pipelines which are only accessible on one side, such as for example risers in production lines from underwater reservoirs. In these pipelines, a detection section having both ends accessible, in correspondence with which acoustic sensors can be installed is not in fact available.

An objective of the present invention is to overcome the limitations described above and in particular to conceive a system for the continuous detection of impacts on pipelines for the transportation of fluids which can also be effectively applied to underwater installations of pipelines.

Another objective of the present invention is to provide a system for the continuous detection of impacts on pipelines for the fluids transportation which can be easily installed as it does not require the positioning of sensors along sections of pipeline positioned at the sea bottom.

A further objective of the present invention is to provide a system for the continuous detection of impacts on pipelines for the transportation of fluids which can also be used for pipelines accessible from one side only.

Last but not least objective of the present invention is that of conceiving a method for the continuous detection of impacts on pipelines for the transportation of fluids which guarantees a high detection precision of both the position in which the impact has taken place and also the instant and intensity of the impact in order to determine the entity of damage suffered by the pipeline.

These and other objectives according to the present invention are achieved by providing a system and a method for the continuous detection of impacts on pipelines for the transportation of fluids as specified in the independent claims.

Further characteristics of the system and method are object of the dependent claims.

The characteristics and advantages of a system and method for the continuous detection of impacts on pipelines for the transportation of fluids according to the present invention will appear more evident from the following illustrative and non-limiting description, referring to the enclosed schematic drawings, in which.

Figure 1A:
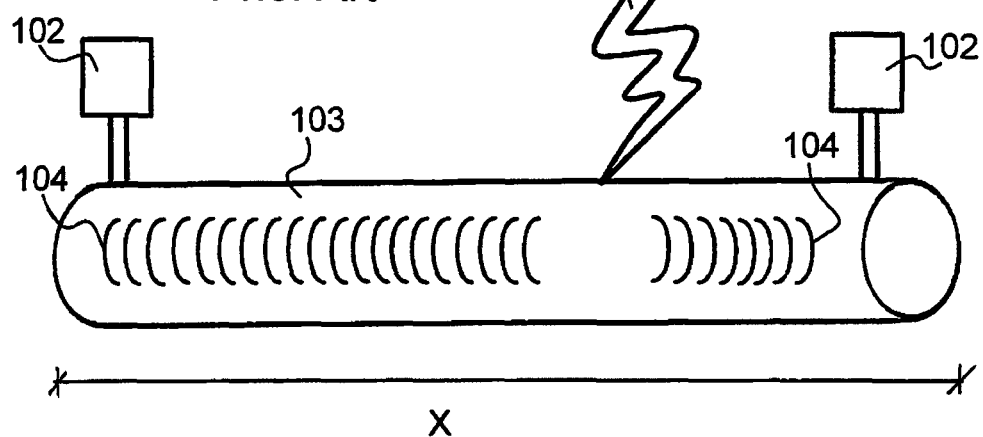
FIG. 1a is a schematic representation of detection of an impact on an underground pipeline monitored by means of a first known system, based on the use of hydrophones, for revealing impacts on pipelines for the transportation of fluids.

With reference to the figures, these show a system for the continuous detection of impacts on pipelines for the transportation of fluids, indicated as a whole with 10.

The system 10 according to the present invention comprises at least two sensors 11, 12, each installed in correspondence with at least one end of a section length (x) of a pipeline 13 wherein a first sensor 12, of the at least two sensors, is suitable for detecting first acoustic waves 14 which propagate along the mantle of the pipeline 13 and a second sensor 11, of the at least two sensors, is suitable for detecting second acoustic waves 15 which propagate in the fluid inside the pipeline.

The first sensor 12 is preferably a vibro-acoustic sensor, for example an optical fibre sensor or a longitudinal and/or transversal accelerometer, capable of detecting the vibratory motion 14 propagates along the mantle of the pipeline 13 generated by an impact 16 within a detection range x, for example having a length of up to about 50 km.

Analogously, the second sensor 11 is a hydrophone capable of detecting the presence of a wavefront 15 also generated by the same impact 16, which propagates inside the fluid along the development of the pipeline 13.

Figure 2:
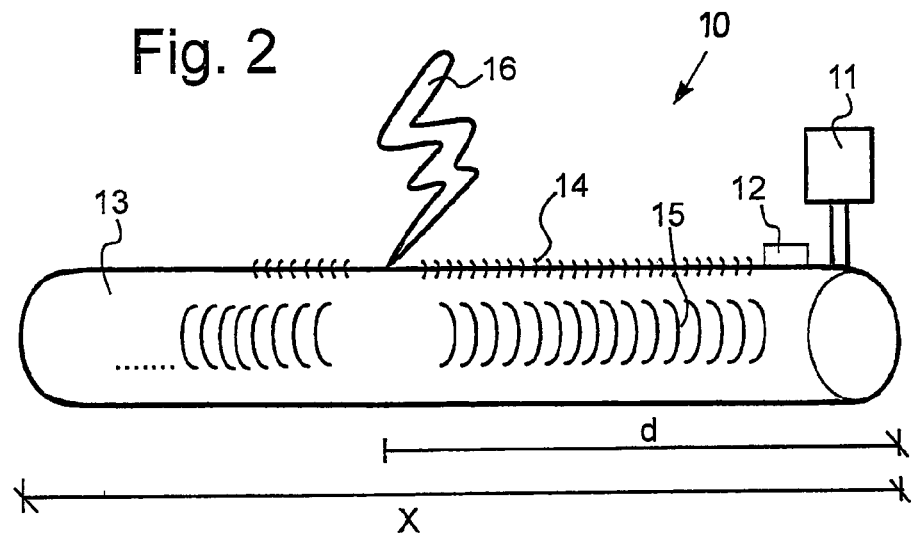
FIG. 2 is a schematic representation of the detection of an impact on a pipeline monitored by means of the system for the detection of impacts on pipelines for the transportation of fluids according to the present invention.

The installation of the at least two sensors 11, 12 suitable for detecting acoustic waves having different wave characteristics, and in particular different propagation rates and/or attenuation degrees, as they are propagated in different means, allows an accidental impact 16 to be detected, which has taken place on said section x of the pipeline 13, in terms of position, impact instant and intensity also when both sensors 11, 12 are positioned at the same end of the section length x as illustrated in FIG. 2.

In particular, the section subject to detection x monitored has a length equal to the capacity of said sensors 11, 12.

The position, generation instant and intensity of the impact 16 are determined by means of a correlation between the signals registered by both sensors 11, 12. The waves, in fact, propagate in the fluid and along the mantle of the pipeline 13 with different propagation rates and attenuation degrees, thus reaching the respective sensors 11, 12 at different times and intensities, also when these are substantially situated in the same position.

If the propagation rates $v_1, v_2$ and degree of attenuation of the vibro-acoustic waves in the two means (fluid and mantle) are known, it is possible to determine the relative distance between the impact point 16 and said sensors 11, 12, in addition to the formation instant and initial intensity of the same 16 on the basis of the time difference and difference in intensity of the signals revealed by the two sensors 11, 12.

The propagation rates and degree of attenuation of the vibro-acoustic waves are linked to the materials in which they are diffused and can be measured a priori for each of these.

The sensors 11, 12 are preferably arranged in the same position of the pipeline, but the system also functions perfectly when the sensors 11, 12 are at a distance from each other, for example if they are positioned at opposite ends of the section subject to detection x.

The system 10 according to the present invention, can also comprise a greater number of detection sensors 11, 12 substantially positioned in correspondence with at least one end of a section subject to detection x, in order to increase the degree of accuracy of the surveys.

Figure 3:
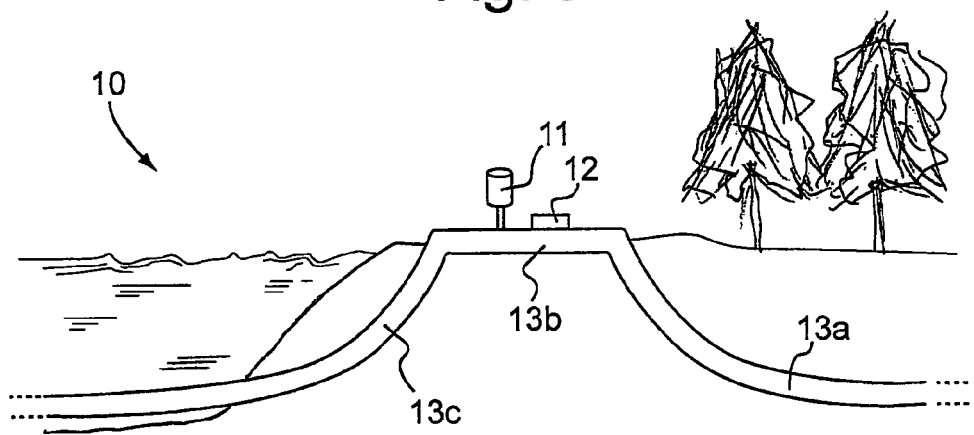
FIG. 3 is a schematic illustration of the system of FIG. 2 installed on a pipeline having an underwater section.
Figure 4:
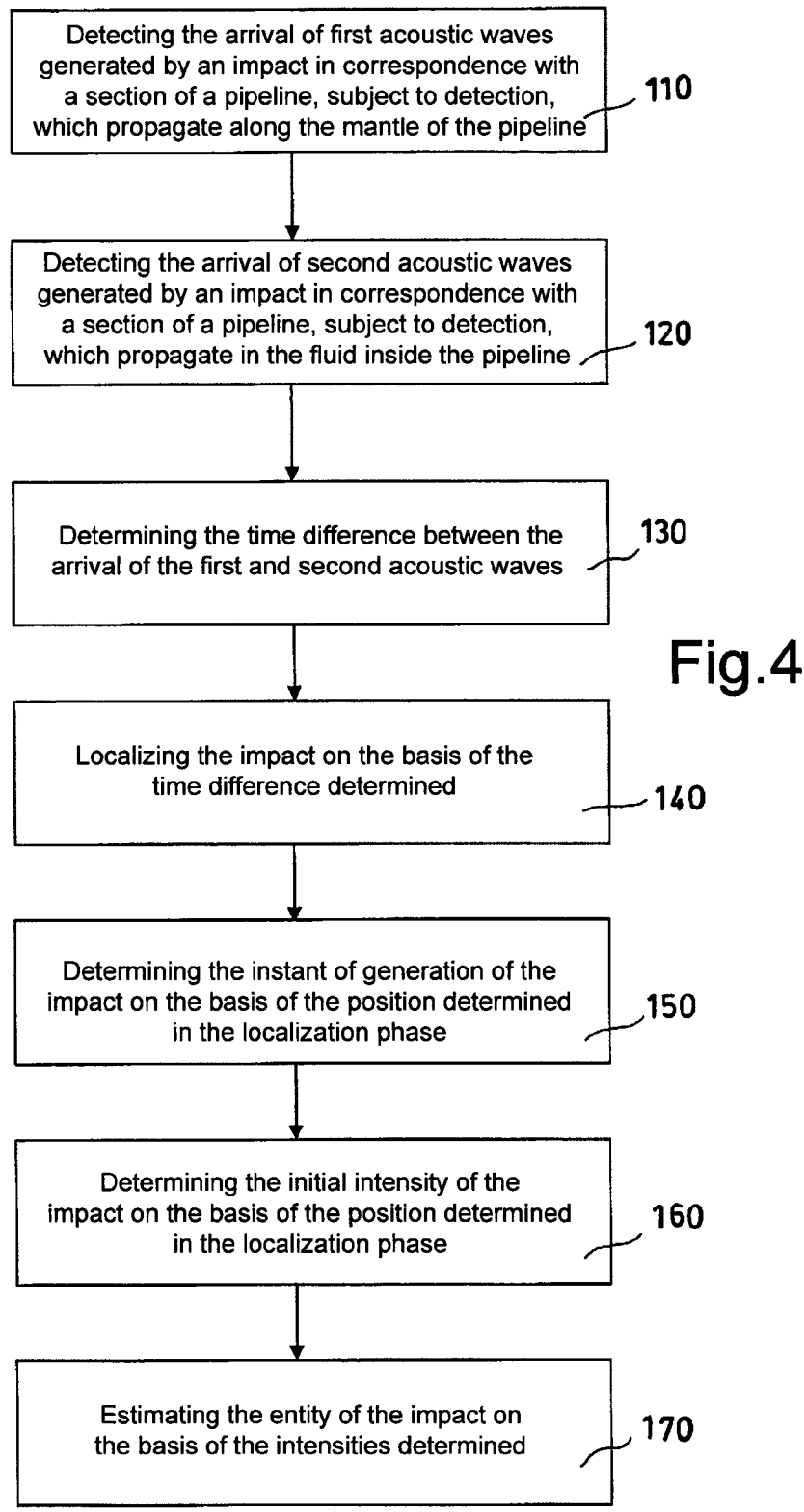
FIG. 4 is a block scheme of the method for the detection of impacts on pipelines for the transportation of fluids according to the present invention.

FIG. 3 illustrates a possible application of the system 10 for the detection of impacts on underwater pipelines for the transportation of fluids according to the present invention, wherein a pipeline 13 has at least a first underground, section 13a upstream, a second section 13b which is close to ground level and is positioned in correspondence with a shore, and also a third underwater section 13c.

Using the simple positioning of the two sensors 11, 12, suitable for detecting acoustic waves having different wave characteristics in correspondence with the second section of pipeline 13b, it is possible to detect the position, generation instant and intensity of possible impacts which take place in the underwater section 13c.

Figure 1B:
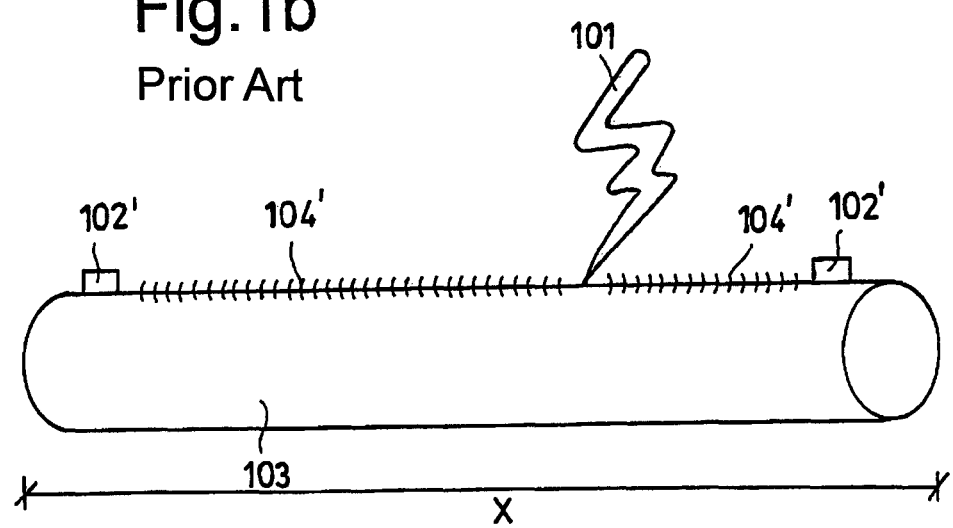
FIG. 1b is a schematic representation of a detection of an impact on an underground pipeline monitored by means of a second known system, based on the use of accelerometers, for revealing impacts on pipelines for the transportation of fluids.

Possible impacts along the first underground section of pipeline 13a can be possibly revealed through traditional systems of the known type, such as, for example, those illustrated in FIGS. 1a and 1b.

Furthermore, for the installation of the system 10, it is preferable but not necessary for there to be a section of pipeline 13b emerging from the ground, as the sensors 11, 12 can also be installed in an underground section of pipeline 13a.

The functioning of the system 10 for the continuous detection of impacts on pipelines for the transportation of fluids is described hereunder on the basis of the embodiment illustrated, wherein both sensors 11, 12 are situated in substantially the same position in correspondence with the same end of a section subject to detection x.

When impacts 16 takes place, the acoustic waves are generated, which propagate in both the fluid inside the pipeline 13, and also along the mantle of said pipeline 13. When propagating along the mantle of the pipeline 13, a first acoustic wave 14 reaches the first sensor 12 which, as it is continuously perceptive, detects the arrival of the first acoustic wave 14 and generates a first corresponding signal (phase 110).

After a time interval Δt, when there is the arrival of a second acoustic wave 15 which propagates through the fluid inside the pipeline 13, the second sensor 11—also continuously perceptive—detects said arrival and generates (phase 120) a second signal.

The time interval Δt of the arrival of the two acoustic waves 14, 15 is then determined (phase 130) and using the same Δt, the impact 16 is localized (phase 140) by determining the distance d between the two sensors 11, 12 and the point in which the impact has taken place.

In the particular configuration of FIG. 2, in which the first sensor 12 and second sensor 11 are substantially in the same position, the distance d is calculated on the basis of the following equation:

$$d=((v_1*v_2)/\Delta v)*\Delta t$$

where $v_1$ and $v_2$ are the propagation rates of the acoustic waves along the mantle of the pipeline 13 and in the fluid inside the 13 itself, respectively, and $\Delta v$ is the difference between the two rates $v_1, v_2$.

Once the distance d has been determined, it is possible to determine the generation instant of the impact starting for example from the instant of arrival of the first acoustic wave 14 in correspondence with the first sensor 12 and subtracting the interval determined from the ratio between the calculated distance d and the propagation rate $v_1$ of the acoustic waves along the mantle of the pipeline 13 (phase 150).

Analogously, it is possible to determine the initial intensity of the impact 16, by adding to the intensity revealed, the attenuation in the respective propagation phase calculated by multiplying the attenuation index of said phase by the distance calculated d (phase 160).

On the basis of the intensity revealed and initial position of the impact, in addition to the attenuation factors of the first and second acoustic waves (14, 15), it is finally possible to estimate the entity of damage on the pipeline 13 (phase 170).

The characteristics of the system and method for the continuous detection of impacts on pipelines for the fluids transportation, object of the present invention, as also the relative advantages, are evident from the above description.

By contemporaneously using perceptive sensors of at least two types of waves, such as, for example, sensors that detect the waves propagating along the fluid transported and others which detect the waves propagating along the pipeline, and by an appropriate processing of the known data with those revealed by the sensors, it is possible to localize the impact even if for providing the surveys are provided at the same side with respect to the impact point.

This system can therefore also be successfully applied for the monitoring of the coastal section of underwater pipelines or risers in production lines without the necessity of installing sensors at the sea bottom.

Following an accurate time synchronization of the detection sensors, high precision levels are reached in measuring the time difference that the sensor detects the waves generated after an impact with. In this way, an equally high precision is obtained in the localization of the impact and all the information deriving therefrom such as intensity of the impact and probable effects. Finally, the distance and intensity obtained allow determining with good approximation the entity of the impact and giving indications on the type of damage.

Analogously, the system and method for the continuous detection of impacts on pipelines for the fluids transportation, object of the present invention, can also be conveniently applied to pipelines installed on land, proving to be particularly advantageous in the case of pipelines not uniformly accessible along the whole of their extension, for example for the installation of hydrophones. In this case, the use of the mixed system according to the present invention is particularly favourable.

Finally, the system and method conceived can obviously undergo numerous modifications and variants, all included in the invention; furthermore all the details can be substituted by technically equivalent elements. In practice, the materials used, as also the dimensions, can vary according to technical requirements.

The invention claimed is:

1. A method for continuous detection of impacts on pipelines for fluids transportation, comprising:
    detecting arrival of first acoustic waves generated by an impact which has taken place in a section subject to length of a pipeline through a first sensor installed at one end of the section subject to length, the pipeline including an underwater section that is located underwater and a shore section that is located at a shore, the first acoustic waves propagating in a first acoustic wave transmission phase associated with the pipeline, and the first acoustic wave transmission phase being a mantle of the pipeline;
    detecting arrival of second acoustic waves generated by the impact which has taken place in the section subject to length of the pipeline through a second sensor installed at the same one end of the section subject to length, the one end being located at the shore section of the pipeline, the second acoustic waves having different wave characteristics and a different attenuation index with respect to the first acoustic waves, the second acoustic waves propagating in a second acoustic wave transmission phase associated with the pipeline, and the second acoustic wave transmission phase being a fluid inside the pipeline;
    time synchronizing the first sensor and the second sensor;
    determining the time difference between arrivals of the first and second acoustic waves;
    localizing the impact by identifying a position of the impact along the pipeline on the basis of the determined time difference, the localizing of the impact calculating the distance from the first and second sensor according to equation $d=((v_1 \ast v_2)/\Delta v) \ast \Delta t$, where $v_1$ and $v_2$ are the propagation rates of the first acoustic waves and of the second acoustic waves along the mantle of the pipeline and in the fluid inside the pipeline, respectively, and $\Delta v$ is a difference between the two propagation rates $v_1$ and $v_2$;
    determining generation instant of the first and the second acoustic waves generated by the impact, starting from an instant of arrival of the first acoustic waves at the first sensor and subtracting an interval determined from a ratio between the calculated distance d and the propagation rate $v_1$ of the first acoustic waves along the mantle of the pipeline; and
    determining detected intensity of the first and the second acoustic waves generated by the impact on the basis of the position of the impact determined by the localizing and attenuation factors of the first and the second acoustic waves along the pipeline, by adding to intensity revealed, attenuation in the respective acoustic wave transmission phase calculated by multiplying the attenuation index of the acoustic wave transmission phase by the calculated distance d.

2. The method for continuous detection of impacts on pipelines for the fluids transportation according to claim 1, wherein the first and second acoustic waves differ in propagation rates.

3. The method for continuous detection of impacts on pipelines for the fluids transportation according to claim 1, further comprising:
    estimating an entity of the impact on the basis of the detected intensity of the first and the second acoustic waves, the position of the impact determined by the localizing and the attenuation indexes of the first and the second acoustic waves along the pipeline.

4. The method for continuous detection of impacts on pipelines for the fluids transportation according to claim 1, wherein the first sensor is an accelerometer and the second sensor is a hydrophone.

* * * * *